United States Patent [19]
Gattuso

[11] 3,887,571
[45] June 3, 1975

[54] PREPARATION OF ARYL SUBSTITUTED SULFENAMIDES
[75] Inventor: Marion J. Gattuso, Hoffman Estates, Ill.
[73] Assignee: Universal Oil Products Company, Des Plaines, Ill.
[22] Filed: Apr. 20, 1972
[21] Appl. No.: 246,043

Related U.S. Application Data
[63] Continuation-in-part of Ser. No. 100,508, Dec. 21, 1970, abandoned, and Ser. No. 139,145, April 30, 1971, abandoned.

[52] U.S. Cl....... 260/306.5; 260/239 B; 260/244 R; 260/247.1 L; 260/250 A; 260/250 B; 260/252; 260/256.5 R; 260/267; 260/268 S; 260/279 R; 260/294.8 E; 260/302 SN; 260/306; 260/306.7; 260/307; 260/308 R; 260/309; 260/310 R; 260/326.12; 260/326.9; 260/327 S; 260/329 S; 260/551 S; 260/79.5; 260/775; 424/275
[51] Int. Cl............................................. C07d 91/48
[58] Field of Search............ 260/306.5, 306, 551 R, 260/302 A Primary Examiner—Donald G. Daus
Assistant Examiner—Jose Tovar
Attorney, Agent, or Firm—James R. Hoatson, Jr.; Bernard L. Kramer; William H. Page, II

[57] ABSTRACT
Conversion of a compound having a sulfenamide moiety to the corresponding aryl substituted compound by reaction with an arylamine acid salt.

2 Claims, No Drawings

PREPARATION OF ARYL SUBSTITUTED SULFENAMIDES

CROSS-REFERENCE TO RELATED APPLICATIONS

This is a continuation-in-part of application Ser. No. 100,508, filed Dec. 21, 1970 and now abandoned, and application Ser. No. 139,145, filed April 30, 1971, now abandoned.

DESCRIPTION OF THE INVENTION

Parent application Ser. No. 100,508 teaches the preparation of a N-arylthiazolesulfenamide by the reaction of a thiazolesulfenamide which is unsubstituted or mono- or di-alkyl substituted in the amide moiety with an arylamine acid salt. A continuation-in-part application, Ser. No. 139,145, filed Apr. 30, 1971, further expands this reaction to the preparation of compounds in which the nitrogben atom is disubstituted, at least one of the substitutions being aryl. In the present application, it is shown that this reaction with an arylamine acid salt also may be used for the conversion of other compounds having the sulfenamide moiety to prepare the corresponding aryl substituted compounds.

In one embodiment, the present invention relates to a process for preparing a compound of the formula

which comprises reacting a compound of the formula

with an arylamine acid salt, wherein R is hydrocarbyl, a sulfur-linked moiety, a nitrogen-linked moiety or heterocyclic; $R^1$ is hydrogen, hydrocarbon or heterocyclic; $R^2$ and $R^3$ are hydrogen, non-aryl hydrocarbon or heterocyclic.

In parent application Ser. No. 100,508, R in the above formula is a thiazole configuration and $R^2$ and/or $R^3$ are hydrogen or alkyl. According to the present application, R may be hydrocarbyl and preferably alkyl of 1 to 50 and more particularly of 4 to 12 carbon atoms or cycloalkyl containing from 3 to 12 or more and preferably from 5 to 8 carbon atoms in the ring. In another embodiment, R may be a sulfur-linked moiety and accordingly a disulfide compound. For example, U.S. Pat. No. 2,837,519 teaches the preparation of aminoazole disulfides by reacting sulfur with an aminoazolesulfenamide having the formula (2) above in which $R^2$ and $R^3$ are aliphatic, cycloaliphatic, arylalkyl or together form a single ring consisting of alkylene, oxyalkylene, thioalkylene and iminoalkylene and R is 2-thiazolyl, 2-oxazolyl or 2-imidazolyl. Specific compounds comprise 2-(4-morpholinodithio)-benzothiazole, 2-(di-n-propylaminodithio)-benzothiazole, 2-(di-n-butylaminodithio)-benzothiazole and 2-(piperidyldithio)-benzothiazole. U.S. Pat. No. 2,983,726 teaches the preparation of similar disulfides by the reaction of a 2-mercaptobenzothiazole with a secondary amine and chlorine and then reacting with a sulfur monohalide including sulfur monochloride, sulfur monobromide or sulfur monoiodide. Here again, specifically 2-benzothiazyl-N-morpholinyl disulfide was prepared. These patents illustrate the preparation of compound (2) in the above formula in which R is a sulfur-linked moiety and the details of the preparation of such compounds are embodied by reference into the present application.

Referring to compound (2) above where R is a nitrogen-linked moiety, illustrative compounds are prepared, for example, by the reaction of a secondary amine with sulfur dichloride. For example, two moles of morpholine are reacted with one mole of sulfur dichloride to form dimorpholino sulfide. Similarly, two moles of a dialkylamine or dicycloalkylamine are reacted with one mole of sulfur dichloride to form the corresponding di-(dialkylamino)-sulfide or di-(dicycloalkylamino)-sulfide. These reactions are described in the prior art and such descriptions are embodied by reference into this application.

Referring again to compound (2) above, where R is heterocyclic, the heterocyclic configuration is illustrated by the dimorpholino sulfide described in the preceding paragraph. Other heterocyclic compounds include those in which the R radical is thiazole, thiazoline, thiazolidine, oxazole, imidazole, pyrrole, pyrazole, triazole, dioxazole, piperazine, isoxazine, azepine, indole, isoindazole, benzisoxazine, purine, thiophene, pyridine, pyridazine, pyrimidine, pyrazine, cinnonine, phthalazine, quinazoline, quinoxaline, acridine, phenazine, pyran, dihydropyran, etc. Still other heterocyclic compounds are the dithiolethionesulfenamides, which compounds are described in U.S. Pat. Nos. 3,576,792 and 3,576,821. These compounds in general are prepared by the reaction of a N-halo-amine with a mercaptan. The specific details of preparation set forth in these patents are embodied by reference into the present application.

In all of the examples where R in the above formulas are cyclic or heterocyclic rings, it is understood that the ring may contain substitutions attached thereto and preferably one or two alkyls of 1 to 10 and still more preferably of 1 to 4 carbon atoms each. For example, the morpholino radical may be 2,6-dimethyl or 2,6-diethyl substituted. Similarly, for example, when R is cyclohexyl, the alkyl substitutions may be in the 2, 4 and/or 6 positions.

Referring again to compound (2) above, $R^2$ and $R^3$ are hydrogen, non-aryl hydrocarbon or heterocyclic. It is understood that $R^2$ and $R^3$ may be the same or different. When one or both of $R^2$ and $R^3$ is non-aryl hydrocarbon, it or they may comprise alkyl of 1 to 10 and preferably of 1 to 4 carbon atoms or cycloalkyl containing from 3 to 12 carbon atoms in the ring and preferably cyclohexyl, which cycloalkyl may be substituted with one or two alkyl groups of 1 to 10 and preferably 1 to 4 carbon atoms each. Where $R^2$ and/or $R^3$ are heterocyclic or $R^2$ and $R^3$ together form a heterocyclic ring, the hetercyclic configuration may be selected from these hereinbefore set forth, as well as being substituted by one or two alkyl groups of 1 to 10 and preferably 1 to 4 carbon atoms each. As hereinbefore set forth, compounds defined by (2) above are described in the prior art and are used as a reactant in the process of the present invention.

The following compounds are illustrative but not limiting examples of compounds which may be used as a reactant in the present invention. Where R is hydrocarbon, illustrative examples include butylsulfenamide, pentylsulfenamide, hexylsulfenamide, heptylsulfenamide, octylsulfenamide, nonylsulfenamide, decylsulfenamide, undecylsulfenamide, dodecylsulfenamide, etc., cyclobutylsulfenamide, cyclopentylsulfenamide, cyclohexylsulfenamide, cycloheptylsulfenamide, cyclooctylsulfenamide, cyclononylsulfenamide, cyclodecylsulfenamide, cycloundecylsulfenamide, cyclododecylsulfenamide, etc., and these compounds in which the nitrogen contains one or two substitutents selected from alkyl of 1 to 10 carbon atoms and/or cycloalkyl containing 3 to 12 carbon atoms in the ring. Where R is a carbon atom attached to nitrogen and/or sulfur, illustrative examples include thiazolesulfenamides such as 4,5-dimethylthiazole-2-sulfenamide, 4-ethylthiazole-2-sulfenamide, N,N-dimethyl-2-thiazolesulfenamide, N,N-diethyl-2-thiazolesulfenamide, N,N-dipropyl-2-thiazolesulfenamide, N,N-dibutyl-2-thiazolesulfenamide, 1,2-dithiole-3-thione-5-sulfenamide, N,N-dimethyl-1,2-dithiole-3-thione-5-sulfenamide, N,N-diethyl-1,2-dithiole-3-thione-5-sulfenamide, N,N-diisopropyl-1,2-dithiole-3-thione-5-sulfenamide, N-tertbutyl-1,2-dithiole-3-thione-5-sulfenamide, N-cyclohexyl-1,2-dithiole-3-thione-5-sulfenamide, etc. Where R is a sulfur-linked moiety, illustrative compounds are 2-(4-morpholinodithio)-benzothiazole, 2-(dipropylaminodithio)-benzothiazole, 2-(dibutylaminodithio)-benzothiazole, 2-(piperidyldithio)-benzothiazole, etc. Where R is a nitrogen-linked moiety, illustrative compounds include bis-(diisopropylamino) sulfide, bis-(diisobutylamino) sulfide, bis-(diisopentylamino) sulfide, bis-(diisohexylamino) sulfide, bis-(diisoheptylamino) sulfide, bis-(diisooctylamino) sulfide, etc., bis-(dicyclohexylamino) sulfide, bis-(dicycloheptylamino) sulfide, bis-(dicyclooctylamino) sulfide, dimorpholino sulfide, etc. Where R is heterocyclic, illustrative compounds include benzothiazole-2-sulfenamide and the N-alkyl, N,N-dialkyl, N-cyloalkyl, N,N-dicycloalkyl or N-alkyl-N-cycloalkyl derivatives in which the alkyl contains from 1 to 10 carbon atoms each and the cycloalkyl contains from 3 to 12 carbon atoms in the ring, corresponding oxazole, imidazole, etc., compounds.

The compounds hereinbefore described as illustrative of compound (2) above are utilized as starting reactants for the preparation of the aryl substituted sulfenamides of the present invention. As hereinbefore set forth, such compounds are reacted with an arylamine acid salt. Any suitable acid salt of the arylamine may be used. Particularly preferred acid salts include the hydrohalide salts as hydrochloride salt, hydrobromide salt, hydroiodide salt, etc., with the hydrochloride salt being especially preferred. Other acid salts include the sulfate, phosphate, nitrate, arsenate, borate, hydrocyanate, hydrosulfide, carbonate, etc., as well as organic acid salts including the formate, acetate, propionate, butyrate, oxalate, malonate, malate, citrate, lactate, benzoate, etc. It is understood that the different acid salts are not necessarily equivalent in their reaction with the same or different starting sulfenamide.

Illustrative arylamines for use in preparing the acid salts include aniline, p-toluidine, p-anisidine, p-chloroaniline, etc. Other substituted anilines include o, m and p-alkylanilines in which the alkyl contains from 1 to 6 carbon atoms and 2,3-, 2,4-, 2,5-, 2,6-, 3,4- or 3,5-dialkylanilines, each alkyl containing 1 to 6 carbon atoms. Other arylamines include o, m or p-phenylenediamines, N-$C_1$-$C_{20}$-alkylanilines, N-$C_1$-$C_{20}$-alkylaminonaphthylines, N-cycloalkylanilines, N-cycloalkylaminonaphthalenes, diphenylamines, dinaphthylamines, heterocyclicamines as, for example, aminopyridines, aminoquinolines, indole, indoline, etc. It is understood that the aryl nucleus may contain one or more substituents, preferably being selected from COOH, COOR, $NO_2$, OR, SR, SH and OH where R is alkyl of 1 to 20 carbon atoms. The different arylamine acid salts are not necessarily equivalent for use as reactants in the present invention.

The arylamine acid salt may be obtained from any suitable source or prepared in any suitable manner. A number of these acid salts are available commercially and accordingly are conveniently used in the present invention. The hydrochloride salt may be prepared, for example, by dissolving the arylamine in a suitable solvent, such as diethyl ether, and adding concentrated hydrochloric acid thereto, with intimate stirring, until no further precipitation occurs. The precipitate then is filtered from the solution and washed with ether, followed by drying, either in air or otherwise.

The sulfenamide and arylamine acid salt are reacted in any suitable manner. As a particular advantage of the present invention, the reaction occurs readily and accordingly requires minimum time, which may range from 2 minutes to one hour and more particularly from 5 minutes to 30 minutes. The reaction is readily effected at room temperature although, when desired, a higher temperature may be used which preferably is below about 100°C. The reaction is effected by forming a solution of one or both of the reactants, which may be mildly heated to facilitate solubility. Any suitable solvent may be utilized and conveniently comprises an alcohol as methanol, ethanol, propanol, butanol, etc., a ketone as acetone, methylethyl ketone, diethyl ketone, etc., diethyl ether, dipropyl ether, etc., dioxane, etc., or a mixture thereof or a mixture with water. The solvent employed preferably is one in which both reactants are mutually soluble, although partial solubility of the reactants in the solvent may be satisfactory as with water, ether, etc., but may require longer time in mixing to insure complete reaction. Because the solvent subsequently is removed by evaporation, it is preferred to use a lower boiling solvent for ready evaporation from the product.

In still another method of preparation, the sulfenamide and arylamine are commingled and then the acid is added. For example, the sulfenamide and aniline may be introduced into a suitable zone and, while mixing, concentrated hydrogen chloride solution is added dropwise thereto.

The sulfenamide and arylamine acid salt are reacted in equimolar proportions. However, an excess of the sulfenamide or arylamine acid salt may be employed, which excess generally will not exceed 4:1 molar proportions and thus the reactants may be used in a mole proportion of from 1:1 to 4:1.

As hereinbefore set forth, the sulfenamide and arylamine acid salt or sulfenamide, arylamine and acid are reacted in any suitable manner. The reaction is accomplished by intimate mixing of the reactants, preferably in contact with a solvent, although in some cases the solvent may be omitted. In one method the solid product may be removed by filtering and in another method, particularly when the product is soluble in the solvent, the solvent is evaporated in any suitable manner, preferably under vacuum, and the product recovered as a solid precipitate. The ammonium chloride or other ammonium salt formed in the reaction is removed in any suitable manner and preferably by washing with water. To facilitate removal of the ammonium salt, the solid may first be dissolved in ether and then water washed. The resultant mixture may be dried, in any suitable manner, such as by being contacted with magnesium sulfate, etc., and then the ether removed by evaporation. The product may be further purified as desired by crystallization from ether, benzene or other suitable agent.

The sulfenamides of the present invention will have varied utility as, for example, lubricating oil additives, fungicides, herbicides, and particularly as additives to rubber. The rubber is defined as a vulcanizable diene rubber. Illustrative but not limiting examples of vulcanizable rubbers include styrene-butadiene copolymer (SBR), copolymer of butadiene and acrylonitrile (NBR), copolymers of butadiene or isoprene with alpha-methyl styrene, ring substituted styrenes, chloromethyl styrene, etc., butadiene-isoprene copolymer, isobutylene-isoprene, isobutylene-cyclopentadiene, vinyl-pyridines, etc., polybutadiene, synthetic polyisoprene, ethylene-propylene terpolymers, natural rubber, etc. Although elemental sulfur is a typical vulcanizing agent, it is understood that certain sulfenamides of the present invention may be used as sulfur donors themselves in other vulcanization systems or in conjunction with sulfur-donor vulcanization agents alone or in admixture with lesser amounts of sulfur. The latter systems are generally referred to as "sulfurless" or "low sulfur" vulcanization systems. In such systems the vulcanizing agent is of the thiuram type such as tetramethylthiuram disulfide, dimethyldiphenylthiuram disulfide, dipentamethylenethiuram tetrasulfide, N,N-dimethylthiocarbamyl-N'-phenylsulfenamide, N,N-diethylthiocarbamayl-N'-phenylsulfenamide, etc.

A particular advantage in the use of certain sulfenamides of the present invention is in offsetting the decrease in scorch time encountered when using an antiozonant in the formulation. In one embodiment, the antiozonant is of the phenylenediamine type and includes, for example, N,N'-di-sec-alkyl-p-phenylenediamine in which the alkyl contains from 3 to 12 carbon atoms, N-phenyl-N'-sec-alkyl-p-phenylenediamine in which the alkyl contains 3 to 12 carbon atoms, N,N'-dicyclohexyl-p-phenylenediamine, N-phenyl-N'-cyclohexyl-p-phenylenediamine, etc. In another embodiment, the antiozonant is of the aminophenol type and includes N-$C_3$-$C_{20}$-alkyl-p-aminophenol, N-cycloalkyl-p-aminophenol in which the cycloalkyl ring contains from 3 to 12 carbon atoms, etc. The antiozonant may be used in a concentration of from 1 to about 5 parts by weight per 100 parts of rubber hydrocarbon in the formulation.

The sulfenamides of the present invention are used in the rubber formulation in any suitable concentration and may be within the range of from about 0.5 to about 5 and preferably from 1 to 2 parts of the sulfenamide per 100 parts of the rubber hydrocarbon in the formulation. The sulfenamides of the present invention are incorporated in the rubber formulation in any suitable manner and conveniently are incorporated during milling of the various ingredients including, in addition to the sulfenamide of the present invention, carbon, zinc, oxide, sulfur, stearic acid, antioxidant, antiozonant, etc., all of these being used in conventional concentrations. As another means of controlling the curing of the rubber stock, additional compounds also may be included in the rubber formulation as, for example, thiuram disulfide, N-alkyl-sulfenamides, cyclohexylamine, N-cyclohexylthiophthalimide, mercaptobenzothiazole or other sulfenamides, etc., and/or an excess of sulfur may be used. These additional compounds will be selected for use in conjunction with the sulfenamides of the present invention to produce a formulation having the desired scorch time and the desired vulcanization to prepare a rubber product of desired physical properties. The vulcanization is effected in a conventional manner.

The following examples are introduced to illustrate further the novelty and utility of the present invention but not with the intention of unduly limiting the same.

EXAMPLE I

Example I is the same as Example I of parent application Ser. No. 100,508 in which N-phenylbenzothiazole-2-sulfenamide was prepared by refluxing for 10 minutes a mixture of 2.71 g. (0.015 mole) of benzothiazole-2-sulfenamide, 2.1 g. (0.015 mole) of aniline hydrochloride and 50 ml of methanol. Following completion of the reaction, the solvent was removed by evaporation. The resultant solid was dissolved in diethyl ether, washed with water and the organic extract was dried over magnesium sulfate, following which the solvent was removed by evaporation to yield 3.7 g. (95% yield) of N-phenylbenzothiazole-2-sulfenamide. Purification by elution chromatography on basic alumina and elemental analyses showed 60.21% carbon, 4.04% hydrogen and 10.73% in one case and 10.76% in another case of nitrogen, which correspond to the calculated values of 60.43% carbon, 3.90% hydrogen and 10.84% nitrogen.

EXAMPLE II

Example II of parent application Ser. No. 100,508 describes the preparation of N-phenylbenzothiazole-2-sulfenamide by reacting benzothiazole-2-sulfenamide with aniline sulfate.

EXAMPLE III

In Examples III through XI in parent application Ser. No. 100,508, the reactions of N-tertbutylbenzothiazole-2-sulfenamide with variously substituted aniline hydrochlorides are described. The compounds prepared are, respectively N-(p-bromophenyl)-benzothiazole-2-sulfenamide, N-(p-nitrophenyl)-benzothiazole-2-sulfenamide, N-(2,6-dimethylphenyl)-benzothiazole-2-sulfenamide, N-(p-methylphenyl)-benzothiazole-2-sulfenamide, N-(o-methoxyphenyl)-benzothiazole-2-sulfenamide, N-(p-methoxyphenyl)-benzothiazole-2-sulfenamide, N-(p-methylthiophenyl)-benzothiazole-2-sulfenamide, N-ethyl-N-phenylbenzothiazole-2-sulfenamide and N,N-diphenylbenzothiazole-2-sulfenamide. The details of these preparations are embodied by reference into the present specifications.

EXAMPLE IV

This example describes the preparation of a compound of the formula set forth herein above in which R is a sulfur-linked moiety. In this example, N-phenylamino-2-benzothiazole disulfide was prepared by stirring for about one hour at room temperature a mixture of 2.8 g. (0.01 mole) of 2-(morpholinodithio)-benzothiazole, 2.7 g. (0.01 mole) of aniline oxalate in about 100 ml of methanol. After about 1 hour, the yellow reaction mixture was filtered to remove unreacted aniline oxalate, morpholine oxalate or the mixed salt. The methanol was removed by evaporation to afford a yellow solid. The solid was taken up in ether and subsequently extracted with about 100 ml of water to remove any remaining morpholine oxalate. The ether layer was dried over magnesium sulfate and the ether then was removed by evaporation to afford a yellow solid. The solid then was taken up in hot methanol and allowed to recrystallize. The desired N-phenylaminodithiobenzothiazole was obtained in essentially quantitative yield as a fine white solid, m.p. 104°–105°C. The NMR (Nuclear Magnetic Resonance) spectrum of the product was consistent with the proposed structure. No evidence for any morpholine (or its derivatives) was found in the analysis.

EXAMPLE V

This example describes a preparation in which R in the compound hereinbefore set forth is a nitrogen-linked moiety. This compound is aniline disulfide which it will be noted has the sulfenamide (—S—N—) configuration. In this preparation, 23.5 g. (0.1 mole) of dimorpholine disulfide and 26.5 g. (0.2 mole) of aniline hydrochloride were slurried in about 100 ml of methanol for about one hour, after which time the solvent was removed and the organic portion was taken up in ether and washed with two portions of water to remove the amine salt. The ether layer was dried over magnesium sulfate and the ether removed under vacuum to afford a brown oil. Infrared analysis indicated that the major component of the product was the desired aniline disulfide; however, other impurities also were present. Therefore, a small sample (about 2 g.) was taken up in ether and passed over about 10 g. of alumina to remove the impurities. The light yellow eluant was vacuum distilled to remove the ether solvent, and the sample then was sent for IR analysis. The IR analysis indicated that the pure aniline disulfide was present.

EXAMPLE VI

In the previous preparations, the sulfenamide is reacted with the aniline acid salt. In this preparation, the sulfenamide reactant and arylamine are commingled and the acid is added thereto. Specifically, 57.6 g. (0.2 mole) of N-tertbutylbenzothiazole-2-sulfenamide and 20 g. (excess of 0.2 mole) of aniline were added to a flask containing 100 ml of methanol. The mixture was stirred magnetically and 20 ml (0.2 mole HCl) of concentrated hydrogen chloride solution was slowly added dropwise to the slurry. The addition was continued until all of the acid was added, which required about 20 minutes. The slurry was stirred for an additional one hour. The color of the reaction slowly changed from an off-white to a light green. A substantial amount of heat also was given off during the course of the addition of the HCl solution and for about 15 minutes after the addition was complete. It is believed that the heat was due to the formation of aniline hydrochloride, which reaction is normally exothermic. After stirring for one hour at room temperature, the slurry was filtered and the precipitate was washed with a small amount of methanol and then air dried. The N-phenylbenzothiazole-2-sulfenamide was recovered as an off-white solid in essentially quantitative yield, m.p. 119°–122°C. Mixed melting point with an authentic sample of N-phenylbenzothiazole-2-sulfenamide showed no melting point depression.

EXAMPLE VII

In this example, R in the above compound is hydrocarbyl and more particularly cyclohexyl. The starting sulfenamide is N-cyclohexylsulfenamide and is prepared by the reaction of cyclohexyl mercaptan with cyclohexylamine. The N-cyclohexylsulfenamide is reacted with aniline hydrochloride in substantially the same manner as hereinbefore set forth. The resultant N-phenylcyclohexylsulfenamide is recovered as the desired product.

EXAMPLE VIII

In this example, 5-(4-morpholinothio)-4-butyl-1,2-dithiole-3-thione is reacted with diphenylamine hydrochloride in substantially the same manner as hereinbefore set forth to prepare N,N-diphenyl-4-butyl-1,2-dithiole-3-thione-5-sulfenamide.

EXAMPLE IX

In this example, N-tertbutyl-4-phenyl-1,2-dithiole-3-thione-5-sulfenamide is reacted with aniline hydrochloride in substantially the same manner as described in the previous examples to prepare N-phenyl-4-phenyl-1,2-dithiole-3-thione-5-sulfenamide.

EXAMPLE X

As hereinbefore set forth, the sulfenamides of the present invention serve to offset the decrease in scorch time encountered when a phenylenediamine antiozonant also is incorporated in the rubber formulation. As demonstrated by Example XIII of parent application Ser. No. 100,508, a concentration of 1.25 parts of N-phenylbenzothiazole-2-sulfenamide per 100 parts of rubber hydrocarbon in a styrene-butadiene rubber formulation also containing 3.32 parts per 100 parts of N,-N'-di-2-octyl-p-phenylenediamine antiozonant served to produce a Mooney 5 point rise of 48.0 and a 20 point rise of 56.4. This is in contrast to the Mooney scorch values of 18.0 and 20.5 obtained when 1.25 parts of N-cyclohexylbenzothiazole-2-sulfenamide was used in the styrene-butadiene rubber formulation. Example XIII in application Ser. No. 100,508 also includes results obtained when using the N-p-methylphenyl and N-p-methoxyphenyl derivatives in the rubber formulation.

EXAMPLE XI

Example VIII in application Ser. No. 139,145 referred to above reports the Mooney scorch properties of a styrene-butadiene rubber formulation containing a phenylenediamine antiozonant and N,N-diphenylbenzothiazole-2-sulfenamide. Here again, a high value for the scorch properties is demonstrated.

I claim as my invention:

1. A process for preparing a compound of the formula (1) 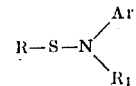

which comprises the step of reacting a compound of the formula:

(II) 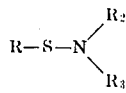

with an arylamine acid addition salt in which the cation has the formula

Ar being phenyl, p-methoxyphenyl, alkylphenyl in which the alkyl has from 1 to 6 carbon atoms, dialkylphenyl in which the alkyl has from 1 to 6 carbon atoms, or aminophenyl, $R_1$ being Hydrogen, phenyl or $C_1$-$C_2$ alkyl; R being 2-benzothiazolyl or 2-thiobenzothiazolyl; and $R_2$ and $R_3$ being hydrogen, $C_1$ to $C_{10}$ alkyl and $C_3$ to $C_{12}$ cycloalkyl or together with the nitrogen atom form morpholino.

2. The process of claim 1 where the compound of Formula II is 2-(morpholinodithio) - benzothiazole, the arylamine acid salt is aniline oxalate and the compound of Formula I is N-phenyl-amino-2-benzothiazole disulfide, and said reaction is effected in the presence of a methanol solvent.

* * * * *